United States Patent
Thompson

[15] 3,675,121
[45] July 4, 1972

[54] DIELECTRIC CONSTANT MEASUREMENT METHOD

[72] Inventor: Don D. Thompson, Corona Del Mar, Calif.
[73] Assignee: Chevron Research Company, San Francisco, Calif.
[22] Filed: June 26, 1970
[21] Appl. No.: 50,022

[52] U.S. Cl. .......................................... 324/61 R
[51] Int. Cl. ...................................... G01r 27/26
[58] Field of Search ...................................... 324/61

[56] References Cited

UNITED STATES PATENTS 2,654,067  9/1953  Bruce ........................................ 324/61
3,515,988  6/1970  Shawhan .................................. 324/61

Primary Examiner—Alfred E. Smith
Attorney—A. L. Snow, F. E. Johnston, G. F. Magdeburger, R. L. Freeland and N. E. Reitz

[57] ABSTRACT

The real part of the complex dielectric constant of a fluid medium containing conducting impurities and water is accurately measured by avoiding the effects of dielectric dispersion and water dipole absorption. Dielectric dispersion is avoided by operating the capacitance probe circuit at a frequency above about 10 megahertz. Water dipole absorption is avoided by operating a capacitance probe circuit at a frequency below about 300 megahertz.

7 Claims, 6 Drawing Figures

INVENTOR
DON D. THOMPSON
BY Norman E. Reitz
Ralph C. Freeland, Jr.
ATTORNEYS

INVENTOR
DON D. THOMPSON
BY Norman E. Reitz
Ralph E. Freeland
ATTORNEYS

DIELECTRIC CONSTANT MEASUREMENT METHOD

This invention covers a new method for measuring the dielectric constant of a fluid medium which contains conducting impurities and water and, more particularly, covers a new method for measuring the dielectric constant of crude oils which contain conducting inorganic colloidal particles and water.

Various schemes and instruments have been utilized in the past to measure the dielectric constant of fluid media. The basic scheme, as disclosed by W. A. Bruce in U.S. Pat. No. 2,654,067, is to insert a capacitance probe into the fluid medium, measure the capacitance of the circuit and then determine the dielectric constant of the medium by dividing the measured capacitance by that obtained by the same probe in a vacuum. The basic scheme has been used in conjunction with specific gravity methods as disclosed, for example, in L. E. Thompson et al., U.S. Pat. No. 2,783,420, and L. E. Kuntz, U.S. Pat. No. 3,253,606. The basic scheme has also been used in conjunction with colorimetric methods as disclosed in J. R. Parsons, U.S. Pat. No. 2,859,757. Recent developments have involved the use of a very low frequency, R. B. McEuen, U.S. Pat. No. 3,394,308; the use of a dual frequency scheme, A. M. Norwich, U.S. Pat. No. 3,255,410; and the use of specific circuitry to minimize conductivity effects of the material undergoing measurement, H. G. Doll, U.S. Pat. No. 3,072,844.

It has long been a problem in accurately measuring dielectric constants of fluid media that the media themselves have an appreciable conductivity or that the media contain impurities which are highly conductive. Due to the conductance of impurities in the medium the current between the plates of the capacitance probe has a conduction current component as well as the regular displacement current component. The frequency dependence of this phenomenon is called dispersion and it has made it difficult to obtain a direct accurate measurement of the dielectric constant because the conduction current component affects the capacitance measured by the standard capacitance probe.

It has also been a problem in actually measuring dielectric constants of fluid media that polar molecules such as water, either as constituents of the media or as impurities, have absorbed some of the power of the measuring circuit. In the case of water, this phenomenon is called water dipole absorption. This loss of power in the measuring circuit has rendered test results inaccurate.

The dielectric constant is a complex function which consists of a real part and an imaginary part: $\epsilon = \epsilon' + i\epsilon''$. The real part, $\epsilon'$, is the component that is commonly referred to as the dielectric constant. The imaginary part, $\epsilon''$, is commonly called the loss factor. The real part of the dielectric constant is due to the displacement current and would be the only component of the dielectric constant if an alternating electric current of infinite frequency was used to drive a standard capacitance probe because there would be no opportunity for a conductive current to flow in the medium and there would be no opportunity for polar water molecules to oscillate and occasion friction losses. The complex part of the dielectric constant is due to the conduction current and to water dipole absorption, i.e., to friction losses associated with the movement of polar water molecules which try to orient themselves with the alternating electric field established by the capacitance measuring circuit. The physical flow of current and the oscillation of polar molecules results in an energy loss in the measuring circuit and therefore limits the effectiveness of capacitance probe circuits by sapping their energy. The energy loss also distorts the measured capacitance data so that the measured dielectric constant is not the real part of the complex dielectric constant, the part that it is desirable to measure, since it is a specific quantity which can be used to identify the presence of a particular substance.

It is therefore an object of this invention to directly measure the real part of the dielectric constant of a fluid medium with an appreciable conductivity or which contains conducting impurities.

It is a further object of this invention to directly measure the dielectric constant of a fluid medium by making measurements which are relatively insensitive to any conduction current flowing in the dielectric medium.

An additional object is the measurement of the dielectric constant of a fluid medium with minimal interference from energy losses due to water dipole absorption.

The method of this invention comprises the operation of a capacitance probe in the fluid medium whose dielectric constant is to be measured at a frequency within the frequency range of 10 megahertz to 300 megahertz. The present inventor has found that the real part of the dielectric constant produces the predominant effect within this range. Conduction effects and water dipole absorption are minimal within this range so the imaginary portion of the complex dielectric function is a minimum.

The contribution to the imaginary part of the composite dielectric constant or the loss factor made by water dipole friction is shown in Table 1 (data taken from Dielectric Materials and Their Applications, A. Von Hippel, 3rd printing, 1961, p. 361), in which the ratio of the loss factor to the real part of the dielectric constant, tangent $\Delta$, is listed as a function of frequency.

TABLE I

| Frequency in Megahertz | Tan $\Delta$ for $T = 1.5°$ C | Tan $\Delta$ for $T = 25°$ C | Tan $\Delta$ for $T = 85°$ C |
| --- | --- | --- | --- |
| 10 | 0.002 | 0.0046 | 0.0125 |
| 100 | 0.007 | 0.0050 | 0.003 |
| 300 | 0.032 | 0.016 | 0.0073 |
| 1,000 | 0.31 | 0.157 | 0.0547 |
| 10,000 | 1.03 | 0.54 | 0.26 |
| 25,000 | 0.42 | 0.265 | — |

Thus, it can be seen that the imaginary portion of the dielectric constant of water, that portion due to water dipole absorption, is insignificant for frequencies under 300 megahertz.

While a window of 10 to about 300 megahertz is suitable in order to avoid water dipole losses and spurious effects due to electrode polarization, the lower end of the window must be contracted to avoid conduction effects due to the presence of conducting impurities. The present inventor has carried out a number of experiments which have shown that conducting inorganic colloidal impurities have an appreciable effect on the dielectric constant measured for a water-in-oil emulsion when measurements are made at frequencies up to 30 or 40 megahertz. For example, a water cut meter operating at a frequency of 10 megahertz was used to measure the dielectric constants of several organic solvents which included trace amounts of a dry clay, montmorillonite. Correct dielectric constant measurements were made. Then when less than 1 percent water was added, to wet the clay, the measured dielectric constant was high by as much as 10 percent. The trace amounts of montmorillonite, when wetted, had a tremendous effect on the measured dielectric constant. The same experiment was conducted with other clays and similar effects were observed although they were not as pronounced.

The conduction effects of clay vary, but they have several common characteristics which enhance their ability to function as conductors. First, they will absorb water and therefore swell so that they have an appreciable surface area and can effectively function as carriers of electric charges, i.e., as conductors. Secondly, while clay particles exist in a variety of shapes, they have a tendency to be sheet-like or to have needle shapes. And it is known that sheet-like or needle shapes have the capability of serving as effectively oriented conductors. See R. W. Sillars, The Properties of a Dielectric Containing Conducting Particles of Various Shapes, Institute of Electrical Engineers Journal, v. 80, no. 484 (April, 1937), pp. 378–394. Thirdly, clays are largely composed of aluminum silicates which inherently are highly conductive materials. For these reasons, a concentration of clay particles in a fluid medium as small as the order of 0.001 percent can create a dispersion in the measured dielectric constant on the order of 10 percent. It is principally the physical state of the conducting impurities rather than a high concentration which creates the marked effect on the measured dielectric constant. For similar reasons, other conducting inorganic colloidal impurities such as barite could produce an analogous result if they are present.

Further objects and advantages of the present invention will become apparent from the following description of the drawings which are incorporated herein and made a part of this specification.

Figure 4:
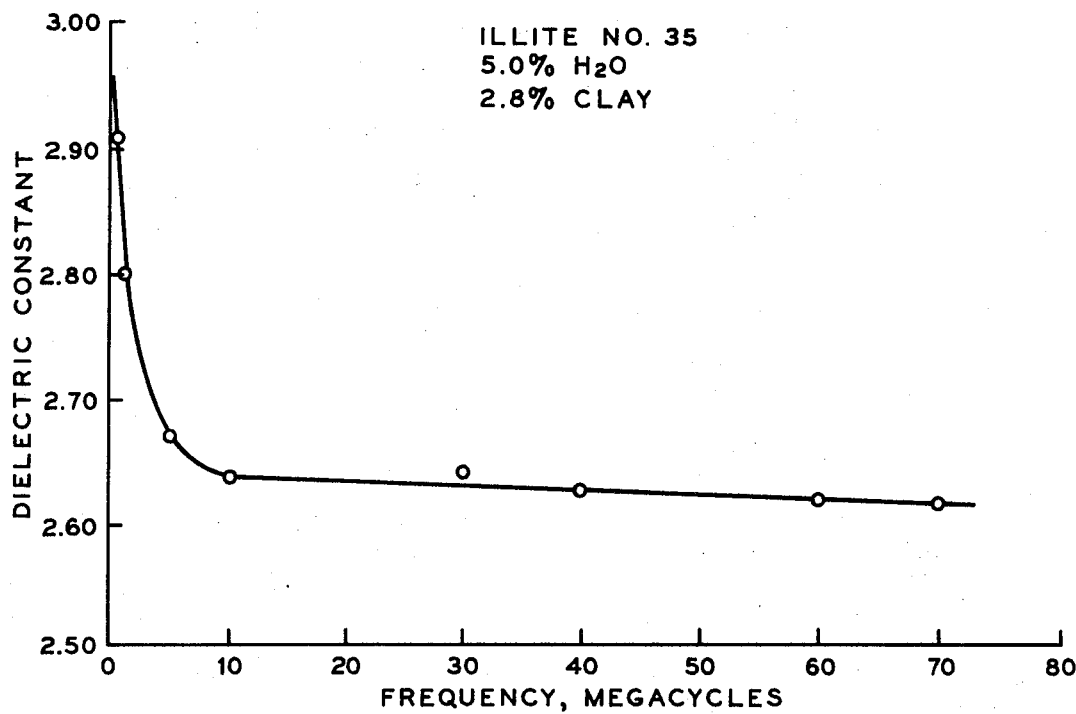
FIG. 4 is a graph showing the dielectric dispersion as a function of frequency of 2.8 percent illite clay and 5 percent water in pure white oil.
Figure 6:
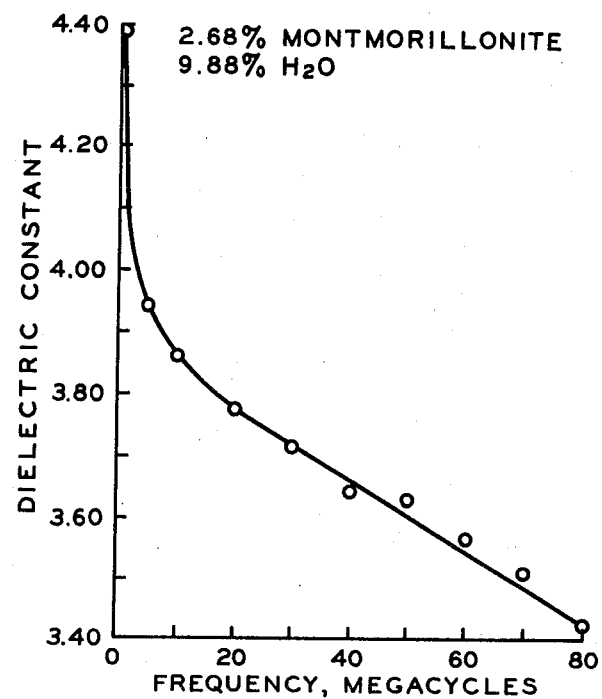
FIG. 6 is a graph showing the dielectric dispersion as a function of frequency of 2.68 percent montmorillonite clay and 9.88 percent water in pure white oil.
Figure 5:
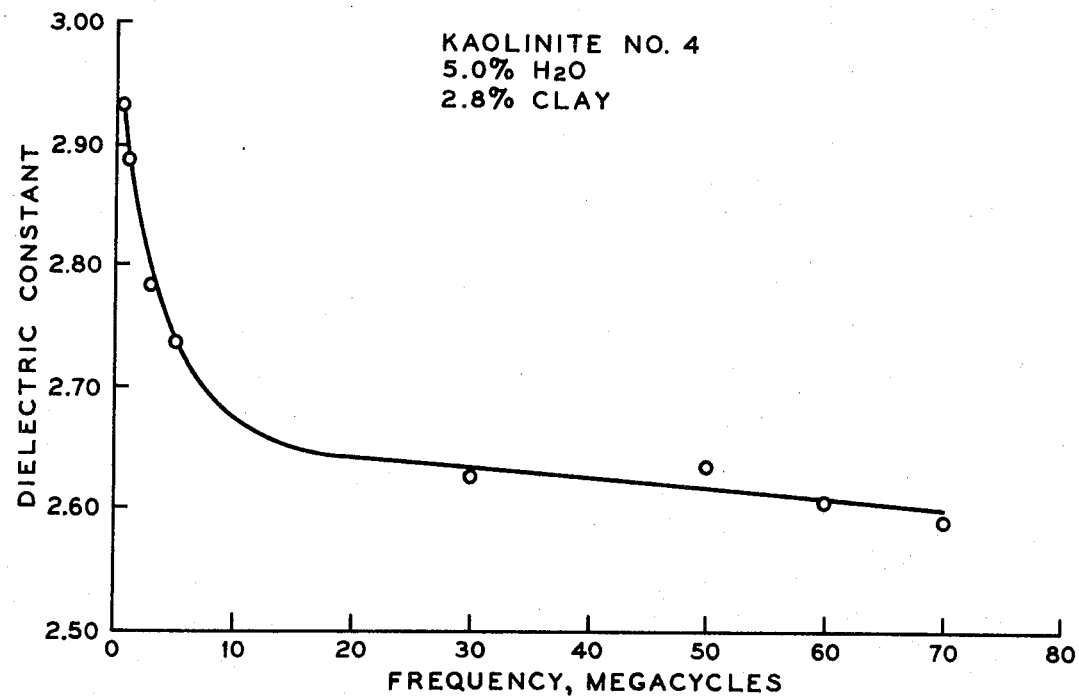
FIG. 5 is a graph showing the dielectric dispersion as a function of frequency of 2.8 percent kaolinite clay and 5 percent water in pure white oil.

There is an apparent variation in the susceptibility of different types of minerals to interfering with the measurement of the dielectric constant. FIGS. 4, 5 and 6 show the dependence of the measured dielectric constant on frequency for three clays: illite, kaolinite and montmorillonite. Illite shows little dispersion above 10 megahertz, kaolinite shows little dispersion above 30 megahertz, but montmorillonite shows a great deal of dispersion up to at least 80 megahertz. All show significant dispersion at frequencies below 10 megahertz.

Contrary to the experimental results obtained by the present inventor, some authors have reported that the measured dielectric constant of crude petroleum is not frequency-dependent in the 1 to 10 megahertz range. See Warren, W. J., Journal of Petroleum Technology, 14, 1207 (1962). In the series of experiments reported in Table II, the dielectric constant of crude oils from a number of locations was measured by a capacitance probe operating at 10 megahertz and subsequently by a probe operating at 100 megahertz. A sample of each crude was centrifuged to determine the exact amount of water-in-oil. The results clearly indicated the frequency-dependence of the measured dielectric constant and also indicated that much more accurate measurements could be made at 100 megahertz.

TABLE II

| Crude Oil | 10 MHz Value | 100 MHz Value | Centrifuge Value |
| --- | --- | --- | --- |
| Flatlake | 5.2 | 0 | 0 |
| W. Fairfield, Texas | 5.2 | 0 | 0 |
| Bantry-Manville | 6.0 | 1.2 | 1.0 |
| Ayoluengo, Spain | 1.0 | 0 | Trace |
| Dead Horse Creek | 2.0 | 0 | 0 |
| Baldwin A | 5.5 | 0 | Trace |
| Caprizo Wilcox | 4.0 | 0 | 0 |
| Murphy-Whittier A | 5.5 | 0 | 0 |
| Murphy-Whittier B | 5.5 | 0 | 0.5 |
| Libya Oasis | 3.0 | 0 | 0.2 |
| Libya amino | 4.7 | 0 | 0 |
| Kelly-Snyder | 0.2 | 0 | 0 |
| Baldwin B | 5.5 | 0 | 0.5 |
| Baldwin C | 6.5 | 1.5 | 1.5 |
| Baldwin D | 10.2 | 4.5 | 6.0 |
| Murphy-Whittier C | 36.0 | 31.5 | 31.5 |
| Las Flores | 49.0 | 44.5 | 43.0 |
| Casmalia | 6.7 | 0.2 | 0 |
| Belmont Offshore | 5.5 | 0 | 0.5 |
| SACS | 9.5 | 1.5 | 3.0 |
| Monte Cristo A | 6.5 | 0 | 1.0 |
| Monte Cristo B | 7.0 | 0.5 | 1.5 |
| Huntington Beach A | 21.0 | 17.0 | 20.0 |
| Mt. Diablo | 6.0 | 0 | 1.0 |
| Surfside | 5.5 | 0 | Trace |
| Swanson River | 2.0 | 0 | Trace |
| Cymric | 4.5 | 0 | 0 |
| Huntington Beach B | 14.0 | 7.5 | 8.5 |
| Tognazini | 14.5 | 7.8 | 8.2 |
| Boscan | 8.0 | 1.5 | Trace |
| Huntington Beach C | 27.0 | 25.0 | 23.5 |
| Patterson Ranch | 8.7 | 0.5 | 0.5 |
| McPhee | 8.5 | 1.8 | 2.0 |

Only one sample out of about 50 showed no appreciable dispersion at 10 megahertz. The percentage of water was calculated in accordance with the following formula:

$$V_{water} = 1 - \frac{\epsilon_w - \epsilon'}{\epsilon_w - \epsilon_o}\left(\frac{\epsilon_o}{\epsilon'}\right)^{1/3}$$

where
$\epsilon$ = measured dielectric constant
$\epsilon_w$ = real part of the dielectric constant of water = 79
$\epsilon_o$ = dielectric constant of crude oil = 2.30 The above results are attributed to the avoidance at the higher frequency of the conductivity effects of conducting impurities. When the inorganic colloidal impurities were precipitated out of two oil samples with the use of pentane, dielectric dispersion was eliminated and a lower value for the dielectric constant was obtained.

Figure 3:
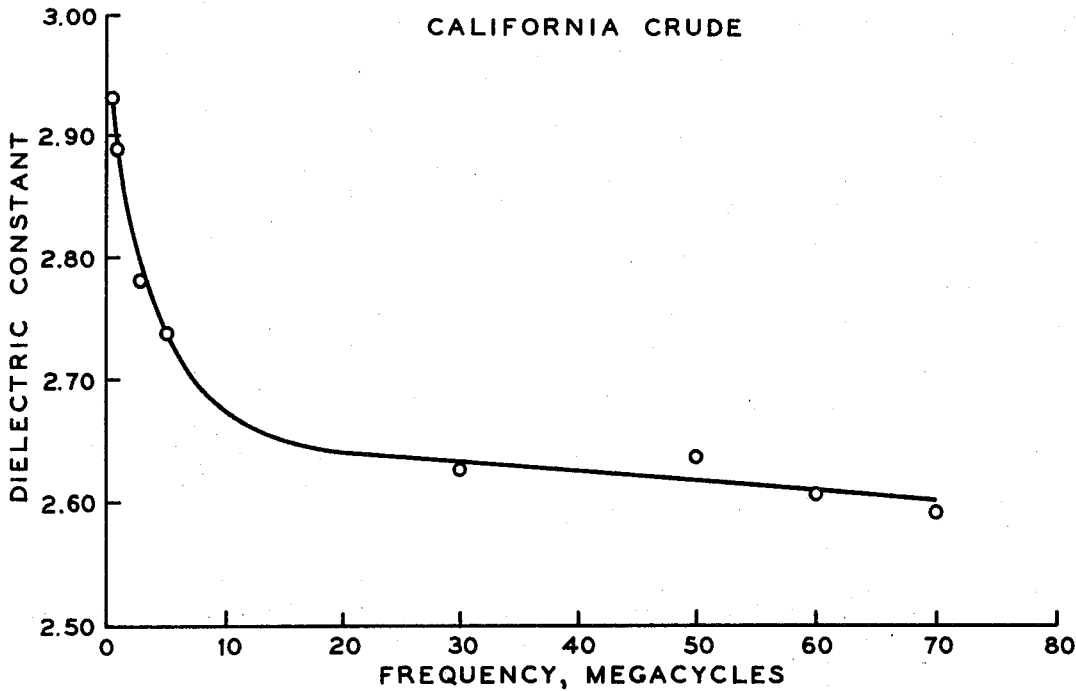
FIG. 3 is a graph illustrating the dielectric dispersion as a function of frequency of a California crude oil.

A similar indication of the frequency dependence of the measured dielectric constant is illustrated in FIG. 3 in which the measured dielectric constant of a California crude is plotted versus frequency. Again, it is clear that there is a frequency dependence and that it is desirable to definitely avoid the 1 to 10 megacycle range and operate at a frequency where conductive effects are substantially avoided, say, at frequencies above 10 megacycles and preferably above 50 megacycles.

A specific example of the operability and utility of the method of the present invention can be obtained by reference to the petroleum industry. Crude oil is nearly always extracted from the ground as a water-in-oil emulsion. For processing purposes, the water is a contaminant and it is both desirable to know with accuracy the amount of water present in the oil and to eliminate it. Also, crude oil, once processed, is often stored with water in tanks and it is desirable to know the location of the interface. And crude oil is often either transported in pipelines which are cleaned by water-flushing or in which water is used as a separator between batches of crude oil; in these pipelines the detection of water-oil interfaces is critical. The determination of water-oil fractions is used in the oil industry to determine whether a pipeline or a refinery should accept a given batch of crude oil; if the water content is too high the batch is not accepted. In one field situation a batch of crude oil which would normally have been accepted by a pipeline was continuously being recycled. A sample of the batch was removed and significant dielectric dispersion was detected. A sample was subsequently taken from a batch which was being accepted by the same pipeline. This subsequent sample showed much less dielectric dispersion.

If there were no dispersion, the measurement of the dielectric constant of the water-in-oil emulsion would be an adequate means of differentiating between the presence of oil and water. Pure oils typically have a dielectric constant on the order of 2, while water has a dielectric constant on the order of 79. If no conducting impurities were present or if there were no losses due to the friction of water dipoles, the composite measured dielectric constant would reflect the amounts of oil and water present. Thus, the measured dielectric constant could be used to determine the percentage of water and the percentage of oil. However, the presence of conducting impurities and the existence of losses due to water dipole friction makes it impossible to accurately measure the fraction of water and the fraction of oil. Inaccurate dielectric constant measurements made in water-in-oil emulsions have resulted in inaccurate ascertainment of water to oil ratios which have resulted in too much water being present in the mix delivered to refineries, or which have resulted in overpayment of royalties to landowners or governmental entities that are supposedly paid a royalty on the volume of crude oil, not on the volume of the water-in-oil emulsion, extracted from their land. Pipeline control valves have failed to react to changes in the composition of the crude oil emulsion; typically, they can detect gross changes such as a change from water to water-in-oil, but they cannot pick up gradual or slow changes in the water content of water-in-oil emulsions, say, for example, from a 2 percent to a 3 percent mixture of water-in-oil. This insensitivity to small changes is due to the overwhelming influence of the conducting inorganic colloidal impurities, such as clay particles, on the measured composite dielectric constant when the impurities are present.

Figure 1:
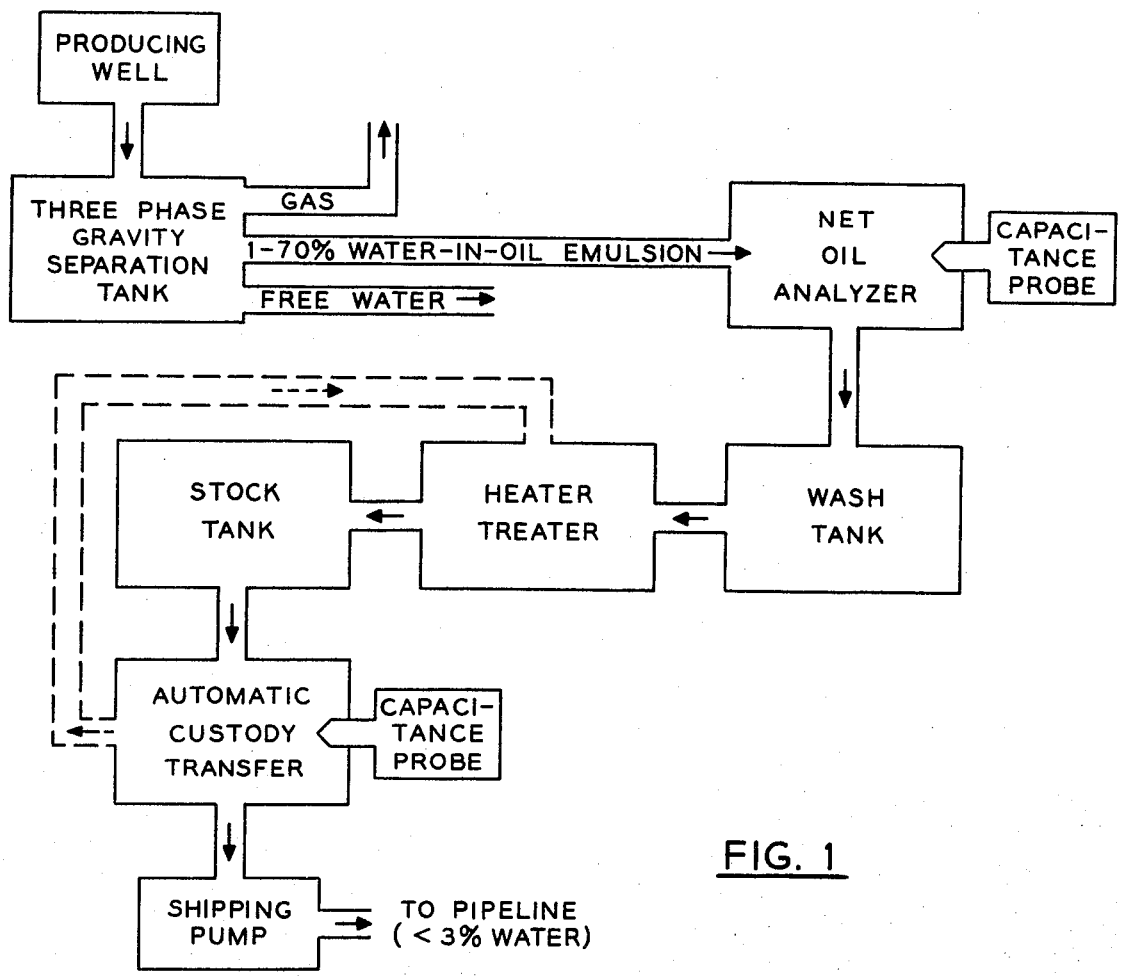
FIG. 1 is a flow diagram illustrating an application of the present invention wherein capacitance probes are utilized in a completely automated oil field operation.

A more detailed understanding of the use of capacitance measuring probes in the oil industry can be had by reference to FIG. 1, a schematic flow diagram of an automated oil field well-to-pipeline operation. Crude oil is pumped directly to a gravity separation tank where it resides for a specified period of time. Natural gas is extracted from the top of the tank, free water from the bottom and a water-in-oil emulsion from the middle. Interface control in the tank is maintained by electronic or floating means so that only the desired water-in-oil emulsion is fed into the flow of the system. The emulsion typically contains from 1 to 70 percent water. The emulsion is fed into a net oil analyzer, a vessel in which a capacitance probe is operating. The electrical output of the probe, if it functions properly, is a measure of the amount of oil present and is used to calculate royalty payments.

As shown in FIG. 1 the emulsion is next fed into a wash tank where de-emulsifiers are added and where further gravity separation may occur. The emulsion is next fed into a heater treater which further breaks down the emulsion by heating. If the volume of oil produced is not great enough to be fed directly into a transportation pipeline the emulsion may then be stored in a stock tank. Finally, when a sufficient volume is accumulated, the stock is fed to an automatic custody transfer unit which will transfer it to the pipeline if less than a specified amount of water is present. The determination of the water/oil fraction is made by a capacitance probe. If more than the specified amount of water, say 3 percent, is present, the stock is recirculated to the heater treater; if the shipping criterion, say 3 percent, is met, the stock is fed to the pipeline. The amount of oil shipped is tabulated by a positive displacement meter. Samples of the oil being transferred to the pipeline are constantly being taken so that a centrifuge test check can be made on the water/oil fraction. This last procedure reflects the distrust of commercially available capacitance probes and points out the need for a reliable capacitance measuring method. Centrifuge checks are time consuming and unwieldy whereas a reliable capacitance measuring method will operate without human intervention.

Figure 2:
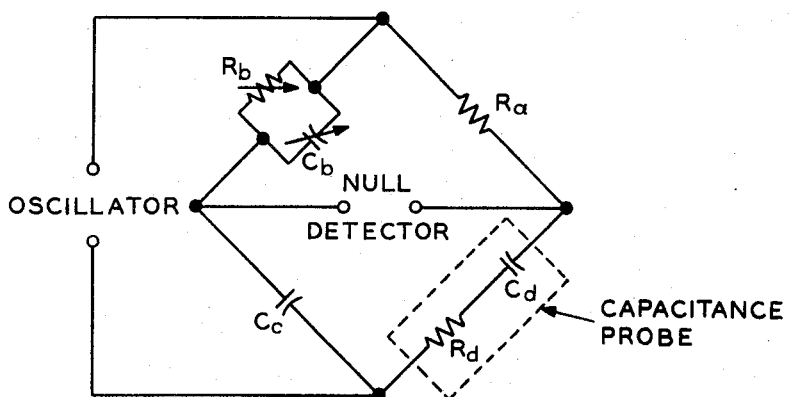
FIG. 2 is a schematic diagram of a capacitance probe circuit which can be used to practice the method of my invention.

Resonance circuits with a vacuum-tube voltmeter readout are typically employed to drive the standard capacitance probe with which this invention is practiced. Ample description of five types of suitable resonance circuits may be found in Dielectric Materials and Their Applications, A. Von Hippel, ed., at pp. 58–62. Null methods embodying resistive and capacitance-arm bridges are less desirable in the 10 to 300 megahertz range due to the residual impedances encountered in the peripheral elements of any circuit. FIG. 2 is a schematic illustration of a bridge circuit. When the capacitance probe is inserted in the test medium an unknown impedance consisting of resistance $R_d$ and capacitance $C_d$ is introduced into the circuit. When variable resistance $R_b$ and variable capacitance $C_b$ are matched to the capacitance probe impedance a null is detected across the bridge and the capacitance of the test medium is thereby determined. A further and acceptable measuring circuit can be devised utilizing transmission line measurements described fully in Von Hippel, supra, at pp. 63–70.

While specific examples have been used to explain the method of the present invention and various applications of the present invention have been enumerated, the invention is intended to be limited only by the scope and spirit of the appended claims. While water-in-crude oil emulsions have been used as a specific example, the method of my invention is applicable as well to any medium containing conducting impurities which cause dielectric dispersion and containing water which causes water dipole absorption.

I claim:

1. The method of measuring more accurately at low concentrations the water content of a water-in-oil emulsion by determining the real part of the complex dielectric constant of said water-in-oil emulsion whose measured dielectric constant is not adversely affected by the contribution of dielectric dispersion and water dipole absorption due to clay particles in said emulsion which method comprises inserting a capacitance probe into said water-in-oil emulsion, driving said capacitance probe by an alternating current circuit with a frequency within the range from 40 megahertz to 300 megahertz, measuring the capacitance of said capacitance probe in said water-in-oil emulsion and calculating the real part of the complex dielectric constant, $\epsilon'$, of said emulsion by means of the formula: $\epsilon' = C/C_o$, where $C_o$ equals capacitance of the circuit in a vacuum and C equals the capacitance measured in the medium.

2. The method of claim 1 wherein said capacitance probe is driven by an alternating current circuit with a frequency within the preferential range of 70 to 150 megahertz.

3. The method of measuring more accurately the real part of the complex dielectric constant of a water-in-crude oil emulsion containing conductive inorganic colloidal impurities, such as clay, to determine the water cut of said emulsions which avoids the conduction effects of said water and inorganic particles, which method comprises inserting a capacitance probe into said emulsion, driving said capacitance probe by an alternating current circuit at a frequency within the range from 40 megahertz to 300 megahertz, measuring the capacitance of said capacitance probe in said emulsion, calculating the real part of the composite dielectric constant of said emulsion by means of the formula: $\epsilon' = C/C_o$, where $C_o$ equals capacitance of the circuit in a vacuum and C equals the capacitance measured in said emulsion, and indicating the water cut of said emulsion in accordance with the formula:

$$V_{water} = 1 - \frac{\epsilon_w - \epsilon}{\epsilon_w - \epsilon_o}\left(\frac{\epsilon_o}{\epsilon}\right)^{1/3}$$

wherein:

V water = water cut of said water-in-oil emulsion, $\epsilon_w = 79$ (the real part of the dielectric constant of water), $\epsilon_o = 2.30$ (the real part of the dielectric constant of crude oil), $\epsilon'$ = the real part of the measured dielectric constant.

4. The method of claim 3 wherein said capacitance probe is driven by an alternating current circuit with a frequency within the preferential range of 70 megahertz to 150 megahertz.

5. The method of measuring the real part of the complex dielectric constant of a water-in-crude oil emulsion containing conductive clay particles which avoids the conduction effects of said clay particles and which avoids the dipole absorption of said water so that said real part of the complex dielectric constant varies more directly with the percentage of water in said water-in-crude oil emulsion where the concentration of water is less than about 10 percent, which method comprises inserting a capacitance probe into said water-in-oil emulsion, driving said capacitance probe by an alternating current circuit at a frequency within the range from 40 megahertz to 300 megahertz, measuring the capacitance of said capacitance probe in said water-in-oil emulsion, and calculating the real part of the complex dielectric constant of said water-in-oil emulsion by means of the formula: $\epsilon' = C/C_o$, where $C_o$ equals the capacitance of the circuit in a vacuum and C equals the capacitance measured in the medium.

6. The method of claim 5 wherein said capacitance probe is driven by an alternating current circuit with a frequency within the preferential range of 70 megahertz to 150 megahertz.

7. The method of measuring with greater accuracy the water cut of a water-in-oil emulsion at concentrations of water of less than about 10 percent water wherein said emulsion contains sufficient clay material to adversely affect the accuracy of said measurement which comprises subjecting a sample of a water-in-oil emulsion to an electric field at a frequency of from 80 megahertz to 120 megahertz across a pair of capacitor plates, and measuring the real part of the dielectric constant of said emulsion present between said plates as an indication of said water cut without error introduced by the conductivity of clay impurities in said water at concentrations of water of less than about 10 percent in said water-in-oil emulsion.

* * * * *